United States Patent [19]
Moy

[11] Patent Number: 5,804,298
[45] Date of Patent: Sep. 8, 1998

[54] MICROCAPSULES WITH REDUCED SHELL WALL PERMEABILITY

[75] Inventor: Jerry Moy, Mahtomedi, Mich.

[73] Assignee: Minnesota Mining and Manufacturing Company, St. Paul, Minn.

[21] Appl. No.: 583,757

[22] Filed: Jan. 11, 1996

Related U.S. Application Data

[63] Continuation of Ser. No. 782,407, Oct. 25, 1991, abandoned.

[51] Int. Cl.$^6$ ....................................................... B32B 5/16
[52] U.S. Cl. ........................ 428/327; 428/321.5; 428/331; 428/402.2; 428/402.21
[58] Field of Search ................................ 428/327, 321.5, 428/331, 402.2, 402.21

[56] References Cited

U.S. PATENT DOCUMENTS

| | | | |
|---|---|---|---|
| 3,516,846 | 6/1970 | Matson | 117/36.2 |
| 3,516,941 | 6/1970 | Matson | 252/316 |
| 3,575,882 | 4/1971 | Vondegaer et al. | 264/4.7 |
| 3,954,666 | 5/1976 | Marquisee et al. | 252/430 |
| 3,954,678 | 5/1976 | Marquisee | 252/451 |
| 4,089,802 | 5/1978 | Foris et al. | 252/316 |
| 4,173,488 | 11/1979 | Vassiliades et al. | 106/213 |
| 4,239,646 | 12/1980 | Vincent et al. | 252/316 |
| 4,396,670 | 8/1983 | Sinclair | 428/321.5 |
| 4,450,221 | 5/1984 | Terada et al. | 430/106.6 |
| 4,552,811 | 11/1985 | Brown et al. | 428/402.21 |
| 4,579,779 | 4/1986 | Ohno | 428/402.2 |
| 4,675,249 | 6/1987 | Bowman | 428/402.21 |
| 4,753,759 | 6/1988 | Fukuo et al. | 264/4.7 |
| 4,753,968 | 6/1988 | Shioi et al. | 523/208 |
| 4,816,367 | 3/1989 | Sakojiri et al. | 428/402.21 |
| 4,879,175 | 11/1989 | Ugro, Jr. | 428/321.5 |
| 4,906,605 | 3/1990 | Kraft | 503/215 |

FOREIGN PATENT DOCUMENTS

| | | |
|---|---|---|
| 463926 | 1/1992 | European Pat. Off. . |
| A-2 019 765 | 11/1970 | Germany . |
| A-75 034 516 | 3/1975 | Japan . |
| A-2 017 938 | 1/1990 | Japan . |
| A-2 164 440 | 6/1990 | Japan . |

OTHER PUBLICATIONS

R. M. Wiley, *J. Colloid Sci.*, 1954, 9, 427.
Plastics Thermoplastics and Thermosets, Editionb 11, Vol. 2, D.A.T.A. Digest™ 1990, pp. 2–185, 2–459, 2–643, 2–930, 2–931, 2–947, 2–1073, 2–188.
Kirk–Othmer, "Encyclopedia of Chemical Technology", Third Edition, vol. 17, Wiley Interscience, New York, 1982, pp. 788–838.

*Primary Examiner*—D. S. Nakarani
*Attorney, Agent, or Firm*—Dale A. Bjorkman

[57] ABSTRACT

Incorporation of inorganic colloidal particles into an encapsulation dispersion results in microcapsules having polymer shell walls further comprising colloidal inorganic particles. Capsules prepared in this manner have been found to be smaller in size, have a narrower size distribution, and exhibit decreased shell wall permeability. Capsules prepared using these colloidal particle dispersions are particularly useful in carbonless imaging constructions such as those containing a fill solution of a color precursor in a hydrophobic solvent and form deeply colored images when combined with a color developer.

10 Claims, No Drawings

MICROCAPSULES WITH REDUCED SHELL WALL PERMEABILITY

This is a continuation of application Ser. No. 07/782,407 filed Oct. 25, 1991, now abandoned.

BACKGROUND OF THE INVENTION

1. Field of Invention

This invention relates to the preparation and use of microcapsules having colloidal inorganic particles incorporated in the shell wall of the microcapsules. The colloidal particles are generally less than about 0.03 microns ($\mu$m) in diameter and the shell may be formed by in-situ or interfacial encapsulation techniques.

2. Description of Related Art

Technology has been available for many years to effectively provide microcapsules with liquid oleophilic ingredients and many methods of preparing capsules have been developed. Most methods of encapsulation require two phases and make use of a dispersion or emulsion of one phase in another. Usually, the phases are a polar phase and a non-polar phase. Although in principle two immiscible organic phases could be used, in practice there is generally an aqueous (polar) phase and an oil containing organic (non-polar) phase. Most commonly, the fill material is the material to be encapsulated and is contained in the organic phase. Two methods of encapsulation that have achieved commercial utility are referred to as in-situ polymerization and interfacial polymerization.

Matson, U.S. Pat. No. 3,516,941, discloses in-situ polymerization reactions in which the material to be encapsulated is dissolved in an organic, hydrophobic oil phase which is dispersed in an aqueous phase. The aqueous phase has dissolved resin precursors, particularly aminoplast resin precursors, which upon polymerization will form the wall of the microcapsule. A dispersion of fine oil droplets is prepared using high shear agitation. The degree of shear has a major effect on the droplet size and may serve to keep the capsule size small. Addition of an acid catalyst initiates the polycondensation of the aminoplast precursors within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule shell at the interface of the two phases, thus encapsulating the fill materials. This process produces the microcapsules. Polymerizations that involve amines and aldehydes, such as those described herein, are also known as aminoplast encapsulations. Urea-formaldehyde (UF), urea-resorcinol-formaldehyde (URF), urea-melamine-formaldehyde (UMF), and melamine-formaldehyde (MF), capsule formations proceed in this manner.

In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the fill materials. Wall formation of polyester, polyamide, and polyurea capsules proceeds via interfacial polymerization.

The size distribution (volumetric diameter) of microcapsules is a critical parameter. There are numerous applications, such as in carbonless paper, where the volumetric diameter of the microcapsule must be within a specified range. Carbonless paper is widely used in the forms industry in preparing business forms. Typically, sheets of carbonless paper are printed upon to create a form, which is then collated with other similarly printed upon sheets to create a form-set such that marking (as, for example, with a pen, pencil or typewriter key) on the top sheet will provide the required number of duplicates. Traditionally, these carbonless paper forms have been printed by conventional printing techniques, such as offset lithography, etc. With the advent of high-speed electrophotographic copiers having dependable, high capacity collating systems, such copiers have been used to print on carbonless paper. Such attempts have encountered problems because carbonless papers having microcapsules coated thereon are subject to premature rupture of the capsules when subjected to pressure, and high speed copiers typically apply pressure to the sheets in various areas within the machine operation. The paper feed assembly station, the toner transfer station, and the heat/pressure fuser station are examples of places where sufficient pressure to rupture capsules can occur. Such rupture leads to machine contamination as well as smudges and areas of color development on the final, collated form-sets.

One approach to preparing carbonless papers for use in electrophotographic copiers has been to use small capsules with a narrow size distribution (see Kraft, U.S. Pat. No. 4,906,605). In general, small capsules are more resistant to accidental rupture than larger capsules. The narrow size distribution is necessary to insure that no large microcapsules are present that might rupture upon handling. Further, if the microcapsules protrude too far from the plane of the paper, the microcapsules might be stripped off the paper or broken. Ideally, a 50% volumetric diameter of less than about 12 micrometers is desired.

Suspending aids are commonly used in microencapsulation for forming small, unagglomerated capsules and have been found to give some advantage in capsule manufacture. These suspending aids have been organic based materials such as polyvinyl alcohol and carboxymethylcellulose. However, some of these aids interfere in the UF encapsulation process. For example, carboxymethylcellulose is capable of providing small capsules in urea-formaldehyde encapsulation. However, this can occur at the expense of wall permeability thereby making it possible for the capsule contents to leak out or for undesirable substances to diffuse into the capsule.

Attempts to use water soluble polymers to control droplet size and subsequent capsule size were carried out by Sinclair, U.S. Pat. No. 4,396,670. Sinclair used water soluble polymers such as acrylamide-acrylic acid copolymers, anionic starch solutions, and sodium alginate in the aqueous phase during encapsulations employing melamine-formaldehyde. These water soluble polymers stabilize the dispersion of the oil phase with respect to the precondensate and inhibit droplet coalescence, thus controlling droplet size as well as stabilizing the dispersion. The water soluble polymer also reacts with the melamine/formaldehyde precondensate to form the capsule shell wall.

Fukuo, U.S. Pat. No. 4,753,759, used an acrylic acid-methacrylic acid or an acrylic acid-itaconic acid copolymer in the aqueous phase to control the manufacture of capsules with shells of urea-formaldehyde, melamine-formaldehyde, or urea-melamine-formaldehyde polymers.

Solubilized inorganic materials have been used to modify the surface of particles to be encapsulated. Ugro, U.S. Pat. No. 4,879,175, encapsulated inorganic pigment particles in microcapsules prepared by in-situ polymerization (such as aminoplast polymerization), interfacial polymerization, and coacervation. Because the pigment particles were insoluble in both the oil and water phases, Ugro used surface modifying agents to control the relative wettability of the solids by the organic and aqueous phases. Surface modifying agents such as titanates and silanes were used to modify the surface of the pigment, render it oleophilic, and thus encapsulable in the capsule fill (oil phase). Control of the relative wettability enabled the deposition of smooth, relatively fault free shells and could be used to control the location of the pigments within the microcapsule structure. Pigments such as metal oxides, carbon black, phthalocyanines, and particularly oil and water insoluble cosmetic colorants were successfully encapsulated by this method.

Terada, et al., U.S. Pat. No. 4,450,221, prepared magnetic toners comprising lyophilic magnetic particles and a resin surrounded by a resin wall to form microcapsules. Treatment with a titanate or silane coupling agent was reported to uniformly disperse the particles in the binder resin, firmly bond the magnetic particle to the resin, and render the surface of the magnetic particles lyophilic. Colorants such as pigments or dyes may be included in the wall forming resin or the toner.

Colloidal materials for forming a stable dispersion of unsaturated and saturated oils in an aqueous phase are commonly used in suspension polymerization and mineral beneficiation. In suspension polymerization, monosize polymeric beads of approximately 5 $\mu$m diameter can be made. See, for example R. M. Wiley *J. Colloid Sci.* 1954, 9, 427. Wiley dealt with the limited coalescence of oil droplets of coarse oil in water emulsions, with a focus on bead size control in suspension polymerization. Wiley's findings were that the nature of the oil phase was of minor importance provided it did not contain surface active groups or impurities, and that the limiting size of the oil droplets is directly proportional to the product of oil phase volume and colloid particle size, and inversely proportional to the weight of colloid employed.

Colloidal silica particles have been used as a capsule fill material. U.S. Pat. No. 3,954,678 and U.S. Pat. No. 3,954,666 disclosed semipermeable microcapsules containing catalysts and ferromagnetic materials as well as colloidal and non-colloidal silica for use as an adsorbent for catalysts or as a chromatographic phase. Encapsulations were carried out by interfacial polymerization and examples using bis (acid chlorides) and diamines were detailed.

Colloidal silica particles have also been used as a capsule wall material. Ohno, U.S. Pat. No. 4,579,779, employed silica as the sole shell wall material to encapsulate organic liquids. No polymers were used in conjunction with the silica. The silica served to control the volatilization and release of the encapsulated organic liquid.

None of the above cited references disclose the incorporation of colloidal inorganic materials into polymeric capsule walls. None of the above work uses inorganic colloidal particles to control the droplet size of the dispersed oil phase in which the continuous (aqueous) phase is continually changing due to a polymerization reaction such as is occurring during an encapsulation. In addition, none of the above work discloses the use of colloidal inorganic particles to control capsule properties in systems such as in carbonless paper. There exists a need for microcapsules with controlled size, narrow size distribution, and limited wall permeability.

SUMMARY OF THE INVENTION

This invention describes microcapsules comprising an oleophilic phase retained within a synthetic polymer shell and a process for making the same. The shell further comprises colloidal inorganic particles. The microcapsules have a 50% volumetric diameter ranging between about 3 to 12 micrometers and are produced by a process comprising the steps of:

(a) dispersing and maintaining an oleophilic fill material as discrete droplets in an aqueous water-soluble pre-polymer solution comprising colloidal size inorganic particles, the fill material being inert towards the pre-polymer and subsequent polymerization products and the colloidal particles having a surface energy such that the particles selectively position themselves at an interface between the oleophilic fill material and the aqueous solution, and (b) polymerizing the pre-polymer solution while maintaining the fill material as discrete droplets, whereupon there is produced an aqueous slurry of microcapsules having shell walls with the colloidal particles incorporated in the shell wall.

Capsules prepared by this process can be used to encapsulate color-formers such as those used in carbonless copy-papers. The encapsulated color-former may then be coated on paper and used in a carbonless paper application.

DETAILED DESCRIPTION OF THE INVENTION

Encapsulation as a means of separating reactive species to prevent premature reaction in certain commercially important products is well known. In one such product, the wall of the capsule is an aminoplast condensation polymer and in another the wall is an interfacial condensation polymer. We have discovered that the incorporation of colloidal inorganic particles in capsule walls controls capsule size and reduces permeability. To this end, the colloids must be present in the encapsulation media during the formation of the shell around the oleophilic phase.

The colloids must remain stable in the environment of the encapsulation process and must not interfere with the formation of the wall. Aminoplast condensation is normally carried out at very low pH while some interfacial polymerizations end at a pH over 8. The colloidal particles become an integral part of the capsule shell during the encapsulation, modifying the properties of the shell and helping control the capsule size. The particles help stabilize the oleophilic phase in the water phase at a controlled oil droplet size before and during the wall formation in the encapsulation process. This requires that the colloid chosen for use be stable under the conditions met during an encapsulation process. For example, a colloid useful in aminoplast encapsulation would need to be stable in the acidic environment of the UF encapsulation. Thus salts such as tricalcium phosphate would not be suitable as colloids in aminoplast capsule formation because they are not stable in the low pH reaction conditions. Similarly, to be stable in an interfacial polymerization, the colloid would need to be stable at the pH conditions found in these processes.

Not all inorganic colloids are suitable for the encapsulation process. In order to be useful in an encapsulation process, the colloid must satisfy several requirements and must have certain properties.

The colloids must have the right wetting properties. Without the right wetting properties, the colloids would stay dispersed in the aqueous phase or enter into the oil phase. The colloidal particles must have a surface energy which promotes migration of the particles to the interface of the aqueous phase and the oil phase. Particles of various types, when dispersed in water immiscible oils, and then mixed or dispersed under high shear into a water phase to produce oil in water dispersions, will show a variety of behaviors depending upon the surface characteristics of the particles relative to the oil and water phases. In particular, particles which are wetted by the water phase and incompletely or poorly wetted by the oil phase will readily move from the oil phase to the water phase during this dispersion process. Attempts to incorporate such a particle into the wall will generally be unsuccessful and lead to a capsule wall containing few, if any, particles. Particles which are completely wetted by the oil phase and incompletely or poorly wetted by the water phase will tend to remain in the interior of the oil phase droplets during the dispersion process. Particles of this type will generally result in microcapsules having the particles in the oil phase of the microcapsule with relatively few particles being abstracted from the oil phase or immobilized in the microcapsule shell wall. Finally, particles which are incompletely wetted by either the oil phase or by the water phase will be found concentrated at the oil/water interface during such a dispersion process. Microcapsules formed using this type of particle will give capsules having the particles in the shell wall of the microcapsule. By in the shell wall is meant that the particles are fixedly associated with the shell either by being wholly entrained in the shell wall or partially entrained at the outside surface or the inside surface of the shell wall. All of these configurations may be collectively described as having a polymer shell further comprising colloidal inorganic particles. The ability to select colloids with specific wetting characteristics relative to the chosen oil and water phase compositions provides the means to control encapsulatability of the particle dispersions and the means to control the ultimate location of the majority of the particles within the microcapsule (i.e., either fixed at or within the microcapsule shell wall or freely dispersed in the core oil phase).

The interfacial tension relationship has been expressed in the following equations (see, R. W. M. Lai and D. W. Fuerstenau *Society of Mining Engineers, AIME, Transactions,* 1968, 247, 549).

If $\gamma_{SO} > \gamma_{WO} + \gamma_{SW}$ the colloids will disperse in the aqueous phase.

If $\gamma_{SW} > \gamma_{WO} + \gamma_{SO}$ the colloids will disperse in the oil phase.

If $\gamma_{WO} > \gamma_{SO} + \gamma_{SW}$ or if none of three interfacial tensions is greater than the sum of the other two, the colloids will move to the oil/water interface.

In the above equations, $\gamma_{SO}$ is the interfacial tension of the colloid-oil interface, $\gamma_{WO}$ is the interfacial tension of the water-oil interface, and $\gamma_{SW}$ is the interfacial tension of the colloid-water interface. From these expressions it is clear that a specific colloid may function well with solvents used in one encapsulation and not perform well with a different encapsulation wherein the solvents used have a different interfacial tension.

The problems associated with determining the interfacial tension of colloidal particle interfacing with water or oil severely limit the usefulness of this relationship. It is apparent that there must be some means for determining the suitability of a specific colloid for use in a specific encapsulation.

For the most efficient colloidal coating on the oil droplets, the colloids should be free of agglomeration. Ideally, the colloids should be predispersed in an aqueous phase.

It is desirable for the colloidal dispersion to contain from about 20% to 40% solids. Lower solids content may lead to greater dilution of the encapsulation reaction and possibly slow the capsule wall formation.

It is also desirable that the colloid particles have a mean size less than about 0.03 $\mu$m, since the capsule shell walls are about 0.1 to 0.2 $\mu$m thick and larger particles may protrude through both the inner surface and the outer surface of the capsule shell. It is desirable that the colloidal particles coat the oil droplets and stabilize them throughout the encapsulation process. The amount of colloid needed thus depends on the total surface area of the oil droplets. Small oil droplets have a higher surface area (per unit weight) than large oil droplets and therefore require more colloidal particles for stabilization.

Size control of the capsules is very important in carbonless paper as discussed above. Thus, the microcapsules prepared in accordance with the present invention are especially useful in the manufacture of carbonless papers for use in electrophotographic copiers and copier duplicators, because small microcapsules may be manufactured in a reproducible manner. Size control is thought to result when the colloidal particles have a certain interfacial tension with respect to the phases present such that the colloidal particles tend to coat the oil droplets in an aqueous solution during initial homogenization or stirring with a high shear mixer. The coating protects the oil droplets from coalescence but does not prevent the droplets from breaking into a smaller size during mixing and become incorporated in the wall during the encapsulation process. It should also be noted that other known suspending agents and dispersants, may also be used with the inorganic colloidal particles described herein.

Test for Selection of Suitable Colloids.

Selection of a suitable colloid may be carried out by a relatively simple procedure. The colloidal dispersion to be evaluated is added to water in a mixing jar. The contents of the jar are homogenized at high speeds in a suitable homogenization apparatus under high shear conditions for a few minutes while the oleophilic mixture of fill solution material to be encapsulated is added. A few drops of the resultant dispersion are then removed, placed on a slide and examined under a microscope to estimate droplet size, droplet size distribution range, and stability of the dispersion. Additional colloid may then be added, and the procedure repeated until further addition has no effect on droplet size, or until the droplets are of the size desired. The pH should also be adjusted to reflect the pH range encountered during the encapsulation process. To be a suitable candidate for an encapsulation, the dispersion must appear to be stable, and the droplet size should be small. Experiment 1 shows the results of testing various colloids.

As noted above, to be useful in the encapsulation process, the colloid must remain stable in the environment of the encapsulation process and must not interfere with the formation of the wall. For UF encapsulations, the capsules formed by incorporating the colloids in the capsule shell wall must be stable in the highly acidic environment encountered during the encapsulation. That is, the incorporation of colloidal particles into the capsule shell wall must not have a deleterious effect on the capsules. A simple method for testing compatibility of the colloid in the capsule wall is to do leak rate studies using, for example, a Thermal Gravimetric Analysis (TGA) instrument for measuring loss of a volatile fill component at an elevated temperature over several hours.

Carbonless Imaging Constructions

As noted above, the invention further includes pressure sensitive imaging systems, i.e., carbonless impact marking papers for the transfer of images, employing capsules prepared as described herein.

Generally, a carbonless paper construction comprises at least two sheets of paper, each with one surface, or side, coated with one of the two primary reactants. The two sheets are generally referred to as a donor sheet and a receptor sheet. When the coated faces, or surfaces, of the two sheets come into contact under sufficient activating pressure so that the reactants can interact, a reaction occurs and an image forms on the receptor sheet.

Carbonless imaging constructions generally involve coating capsules containing one reactant (i.e., the color-former) on one substrate, and coating the other reactant (i.e., the developer) on another, mating, substrate (such as a sheet of paper). Means for preventing the reaction of the two reactants until intended, (i.e., until activating pressure is applied), is also provided. Preferably, a fill solution of the color-forming compounds in a hydrophobic solvent is encapsulated or contained in microcapsules and coated on the back side of a sheet of paper. The sheet is then mated with a receptor sheet coated with a reactant for the color-forming compound. Such reactants include but are not limited to transition metal salts, acid salts, acids, phenolics, and metal phenolates. The microcapsules serve the purpose of isolating the reactants from one another (i.e., preventing reaction) until such time as pressure is applied to the paper for the purpose of creating an image.

Carbonless papers are available commercially from a number of sources, and the chemistry used therein is of two general types. In one commercial product, the capsules on a first sheet (donor sheet) comprise dithiooxamide (DTO) derivatives as the color-forming ligand dissolved in an appropriate hydrophobic solvent within microcapsules and coated onto a back side of a donor sheet in a suitable binder. The back side of the donor sheet is referred to herein as a coated back (CB) sheet. A metal salt, preferably a $Ni^{+2}$ salt, optionally in a suitable binder, is coated onto a front side of a mating, or receptor sheet, herein referred to as a coated front (CF). sheet. The receptor sheet with the transition metal coated thereon comprises the transition salts of organic or inorganic acids. Preferred transition metal salts are those of nickel, although salts of copper, iron, and other transition metals may be used in some applications. Preferred acids useful in forming the transition metal salts are mono-carboxylic aliphatic acids containing about 6 to 20 carbon atoms, such as rosinic acid, stearic acid, and 2-ethylhexanoic acid. Nickel 2-ethylhexanoate and nickel rosinate are particularly preferred transition metal salts. The composition including the transition metal salt may be coated on substrates by conventional coating techniques. The term "suitable binder" refers to a material, such as starch or latex, that allows for dispersion of the reactants in a coating on a substrate. As stated previously, in imaging, the two sheets are positioned such that the back side of the donor (CB) sheet faces the metal salt coating on the front side of the receptor (CF) sheet.

In another type of carbonless paper, the image results from the reaction between an encapsulated leuco dye color-former and an acid developer. The capsules on the back side of the donor sheet comprise leuco dye color-formers such as crystal violet lactone, 3,3-bis(1-ethyl-2-methylindolyl)-3-phthalide,3-N,N-diethylamino-7-N, N-dibenzylamino) fluoran, or benzoyl leuco methylene blue. The receptor sheet, containing the developer, comprises an acidic material such as sheets coated with an acidic clay, a phenolic, or a similar reagent, optionally in a suitable binder, to convert the colorless precursor to its colored form.

This invention is useful for the preparation of capsules using either of these imaging chemistries.

In the present invention, a donor sheet is coated with a slurry comprising microcapsules having a polymer shell further comprising inorganic particles. The microcapsules are filled with a suitable color-forming compound, dissolved in a suitable fill solvent or solvents, preferably a hydrophobic solvent such that the solution is water-insoluble. In addition to the colloidal materials, the shell of the capsules are preferably a water-insoluble urea-formaldehyde product formed by acid-catalyzed polymerization of a urea-formaldehyde precondensate, as shown in G. W. Matson, U.S. Pat. No. 3,516,846, incorporated herein by reference. The capsule slurry may also be combined with a binding agent, such as aqueous sodium alginate, starch, or latex.

When activating pressure is applied to the untreated surface of the donor sheet, the capsules rupture (i.e., those capsules corresponding to the pattern of applied pressure) and release the solution of the encapsulated color-former for transfer to the receptor sheet. Upon transfer, a reaction between the previously separated reactants occurs and a color forms on the receptor sheet.

In many applications the uncoated surface of the donor (CB) sheet comprises a form of some type and the activating pressure is generated by means of a pen or other writing instrument used in filling out the form. Thus, "activating pressure" includes, but is not limited to, pressure applied by hand with a stylus or pressure applied by impact such as by a business machine key, a typewriter key or a computer printer.

Substrates with one surface on which is coated the encapsulated color-former, and a second, opposite surface on which is coated the developer can be placed between the CF and CB sheets, in a construction involving a plurality of substrates. Such sheets are generally referred to as a CFB sheets (i.e., Coated Front and Back sheets). Of course, each side including ligand thereon should be placed such that the CF is in mutual contact with the CB. CFB sheets are typically used in constructions requiring multiple sheets in a single pad.

EXPERIMENTAL EXAMPLES

The following examples are presented to illustrate the operation of the invention and are not to be construed as limiting its scope.

Experiment 1

Evaluation of Suitable Colloids.

As noted above, selection of a suitable colloid may be tested by a relatively simple procedure. A colloidal dispersion of 7.5 g of colloidal silica available under the trade designation as Nalco 1034A colloidal silica was added to 105.0 g of water in an 8 ounce jar. Nalco 1034A is an aqueous acidic silica colloidal dispersion sold by Nalco Chemical Company, Oak Brook, Ill. It has a concentration of 34% solids with a mean particle size of 0.02 $\mu$m and a pH of 3.2. About 22.5 g of an oleophilic mixture of the capsule fill material was added and high speed stirring was begun. A Silverson homogenizer with a 0.75 inch mixing head at 2800 rpm was used. The oleophilic mixture of capsule fill material comprised 23.2 wt % of tributyl phosphate (TBP), 15.5 wt % of diethyl phthalate (DEP), 49 wt % of cyclohexane, and 12.3 wt % of N,N'-(dioctanoyloxyethyl)dithiooxamide (DOEDTO) color-former. The homogenization of the mixture proceeded for 2 min after the addition was complete. A sample of dispersion was removed and examined under a microscope to estimate droplet size and stability of the dispersion. The droplets were observed to be spherical with no coalescence taking place. Droplet size was measured with a Coulter model TA-II size analyzer equipped with a 140 $\mu$m aperture tube. The median of the population and volumetric distributions were 3.4 and 4.3 $\mu$m, respectively.

The Nalco 1034A colloid is thus suitable for testing in encapsulations such as in-situ polymerization to form, for example, urea-formaldehyde, urea-resorcinol-formaldehyde urea-melamine-formaldehyde, or melamine-formaldehyde capsules, and for interfacial polymerization to form, for example, polyurea capsules. Other colloidal particles were tested according to the above procedure including Nyacol 50/20 colloids and Cab-O-Sil colloids, both which had suitable results (available from Nyacol Products, Inc., Ashland, Mass. and Cabot Corporation, Tuscola, Ill., respectively.) Table 1 shows the results of testing various colloids. Dispursal, Nalco ISJ-614 colloids and Nyacol 100/20 colloids all resulted in droplet sizes which exceeded the desired range of this invention. However, Nalco 1034A, Cab-O-Sil EH-5 and Nyacol 50/20 colloids are all acceptable colloids, for the present invention. The resultant dispersions were stable using these colloids and the droplet sizes were within the desired range of this invention.

TABLE 1

Evaluation of Colloidal Dispersions
for Stabilizing a Fill Containing
5% DOEDTO, 4% Pergascript Olive,
3.1% CAO-5, 41.3% DEP, 46.6% Cyclohexane

| Colloid | Chemical Nature | Colloid Size (diameter) | Results |
| --- | --- | --- | --- |
| Dispural | —AlO(OH) | 0.055–0.085 $\mu$m | Fill droplets coalesced even after adding more Dispural |
| Nalco ISJ-614 | Alumina sol | 2 $\mu$m | Additional colloid was necessary. Droplets were spherical and droplet size ranged from 10 to 55 $\mu$m in diameter. The dispersion appeared to be stable, but particle size range was broad. |
| Nyacol 100/20 | Zirconium dioxide sol | 0.1 $\mu$m | Additional colloid was necessary, dispersion was stable. Droplet size ranged from 2 to 44 $\mu$m |
| Nalco 1034A | Silica sol | 0.02 $\mu$m | Dispersion was stable, no additional colloid was needed. Droplet size ranged from 3 to 11 $\mu$m |
| Cab-O-Sil EH-5 | Fumed silica | 0.007 $\mu$m | Dispersion was stable, additional colloid was needed. Droplet size ranged from 3 to 9 $\mu$m. |
| Nyacol 50/20 | Zirconium dioxide sol | 0.05 $\mu$m | Dispersion was stable. Droplet ranged from 2 to 10 $\mu$m. |

Experiment 2

Urea-Formaldehyde Encapsulation using Colloidal Silica.

The encapsulation was based on the method described by Matson. (See, G. W. Matson, U.S. Pat. No. 3,516,941.) A precondensate solution was prepared comprising 191.88 g of formalin (37% formaldehyde), 0.63 g of triethanol amine, 71.85 g of urea, and, 327.93 g of water contained in a baffled one liter reactor equipped with a stirrer and water bath. The triethanol amine and urea were added first, followed by formalin. The mixture was heated to 71.1° C. and the reaction was maintained at 71.1° C. for 2.5 hours. The reaction mixture was then diluted with the water and allowed to cool. The precondensate solution, with about 24% solids, was then ready for use in the encapsulation process.

The precondensate solution and fill were combined to make capsules according to the following procedure. The temperature of the reactor was set to 21.1° C., and 500 g of UF precondensate, 40 g of Nalco™ 1034A colloidal silica, 30 g of NaCl, and 97 g of water were added and mixed to dissolve the salt. The mixture was homogenized with a Tekmar SD-45 homogenizer equipped with a G456 head at 7200 rpm and 202 g of fill solution was added and homogenized for 10 minutes. The fill solution comprised N,N'-(dioctanoyloxyethyl)dithiooxamide, 24.8 g (12.3%); diethyl phthalate, 31.3 g (15.5%); tributyl phosphate, 46.9 g (23.2%); and cyclohexane, 99.0 g (49.0%). The homogenizer was removed and the contents were stirred with a three blade stirrer set 0.5 inch from the bottom of the reactor. The stirrer was set at a speed of 930 rpm. After 5 minutes, 10% HCl was added over a 5 minute period to adjust the pH to 2.85. After 12 minutes, 10% HCl was added over about a 12 minute period until the pH dropped to 1.85. After one hour, the reactor temperature was raised to 60° C. and maintained at that temperature for 1.75 hr to cure the capsules. After curing, the slurry was neutralized with ammonia to pH 8 and cooled to room temperature and the particle size distribution was measured with a Coulter TA-II particle size analyzer equipped with a 140 $\mu$m aperture. The median population diameter was 5.1 $\mu$m. The 50% volumetric diameter was 8.7 $\mu$m.

The capsule slurry (10 g) was added to 65 g of a 1.5% aqueous sodium alginate solution. The mixture was applied to a coated paper using a bar coater with a 75 $\mu$m (3 mil) gap. The coating was allowed to dry at room temperature, and was found to image well as a CB sheet in a carbonless paper construction with a CF sheet coated with a nickel salt. (This sheet was obtained from the Carbonless Products Department of Minnesota Mining and Manufacturing Company, St. Paul, Minn.)

Experiment 3

Urea-Formaldehyde Encapsulation Using Colloidal Zirconium Dioxide.

A urea-formaldehyde precondensate was prepared as shown in Experiment 2 above. The UF precondensate (499.92 g) was aged overnight and was cloudy at pH 8.13. Sodium chloride (30 g) was added and the mixture was charged in a 1 liter baffled reactor. Nyacol Zr50/20 colloidal solution (40 g) was added and the pH was adjusted to 7.0 by the addition of 10% sodium hydroxide solution. Nyacol Zr50/20 colloidal solution is an acid stabilized 20% aqueous colloidal solution of zirconium oxide having a mean particle size of 0.05 pm, and a pH of 3.0. The fill (202 g) was added over 5 min and the mixture was homogenized with a Tekmar SD-45 homogenizer equipped with a G456 head at 7200 rpm for ten minutes. The fill solution comprised N,N'-(dioctanoyloxyethyl)dithiooxamide, 10.1 g (5.0%); Pergascript Olive color former, 8.1 g (4.0%); CAO-5 antioxidant, 6.3 g (3.1%); diethyl phthalate, 83.5 g (41.3%); and cyclohexane, 94.1 g (46.6%). Pergascript Olive is a colorformer sold by Ciba-Geigy and CAO-5 is an anti-oxidant sold by Sherwin-Williams Corporation. The dispersion had a particle size of about 2 to 15 μm as viewed with a microscope. The reactor was placed in a water bath at 21.1° C. and a three blade stirrer set 0.5 inch from the bottom of the reactor was set at 930 rpm to stir the mixture. After 5 minutes 10% hydrochloric acid was added dropwise over a 5 minute period to bring the pH to 3.02. After an additional 12 minutes, the pH was adjusted down to 1.85 by the slow addition of 10% hydrochloric acid over an additional 12 minutes. The mixing was continued for 2 hours at 21.1° C., then the bath temperature was raised to 60° C. and mixing continued for 1.75 hours to cure the capsules. The pH was raised to 8 by the addition of ammonium hydroxide to terminate the reaction.

Capsule size, determined by examination of the diluted capsule slurry with a microscope, indicated that the capsules were between 3 and 22 μm in diameter. The walls were smooth with a spherical to oval shape. Coulter analysis showed a 50% volumetric diameter of 9.1 μm.

The capsule slurry (10 g) was added to 65 g of a 1.5% aqueous sodium alginate solution. The mixture was applied to a coated paper using a bar coater with a 0.076 millimeter gap. The coating was allowed to dry at room temperature, and was found to image well as a CB sheet in a carbonless paper construction with a CF sheet coated with a nickel salt.

Experiment 4

Urea-Formaldehyde Encapsulation with No Colloid Present.

The encapsulation in Example 2 was repeated, but without the colloidal particles added. Upon neutralization with ammonia, evaluation of the capsule size indicated a 50% volumetric diameter of 20.8 μm. The volumetric diameter exceeded the preferred range of 3–12 μm. A CB sheet was prepared using sodium alginate solution as in Experiment 2 above and was found to image well.

Experiment 5

Urea-Resorcinol-Formaldehyde Encapsulation Using Colloidal Zirconium Dioxide.

A one liter baffled reactor was charged with 518 g of water, 11.0 g of urea, 1.1 g of resorcinol, and 40.0 g of Nyacol Zr50/20 colloidal solution. A Tekmar SD-45 homogenizer equipped with a G456 head was used for making the dispersion. The homogenizer was set 1.27 cm from the bottom of the reactor and the mixture stirred at 7200 rpm. A fill solution was added in the amount of 187.61 g and the mixture was homogenized for 10 min. The fill solution comprised N,N'-(dioctanoyloxyethyl)dithiooxamide, 9.4 g (5.0%); Pergascript Olive color former, 7.5 g (4.0%); CAO-5 antioxidant, 5.8 g (3.1%); diethyl phthalate, 77.5 g (41.3%); and cyclohexane, 87.4 g (46.6%). A sample of the dispersion was examined with a microscope and a droplet diameter of 2 to 10 μm was observed. The dispersion appeared to be stable. The pH of the water phase was 1.93 after the Nyacol Zr50/20 was added to the urea-resorcinol solution. The pH was raised to 3.5 by the addition of 10% sodium hydroxide solution. Some thickening of the dispersion occurred but this was only temporary.

The reactor was placed in a water bath set at 50° C., the homogenizer was replaced with a Cole Palmer 5.08 cm diameter three blade agitator (Cole Palmer Catalog No. N-0544-10) set 1.27 cm from the bottom of the reactor, and stirred at about 930 rpm, after which 27.6 ml of 37% formaldehyde solution was added. Stirring was continued for 2 hours, and the pH dropped to 2.90 during the encapsulation. The temperature was lowered to 25° C., and 25 ml of 28% ammonium hydroxide solution was added to neutralize the slurry and bring the pH to 7.0.

The capsule walls were mostly smooth and the shape ranged from spherical to oblate. Coulter analysis gave a 50% volumetric diameter of 4.5 μm, which is in the preferred range of 3–12 μm.

Experiment 6

Urea-Resorcinol-Formaldehyde Encapsulation Using Colloidal Silica.

A one liter baffled reactor was charged with 518 g of water, 11.0 g of urea, 1.10 g of resorcinol, and 5.00 g of Cab-O-Sil™ EH-5. Cab-O-Sil™ EH-5 has a mean particle size of 0.007 μm. The pH of the water phase was 4.45 after the Cab-O-Sil™ silica was added to the urea-resorcinol solution. The pH was lowered to 3.5 by the addition of 27% acetic acid, and 187.61 g of fill solution was added. The fill solution comprised N,N'-(dioctanoyloxyethyl)dithiooxamide, 23.1 g (12.3%); diethyl phthalate, 29.1 g (15.5%); tributyl phosphate, 43.5 g (23.2%); and cyclohexane, 91.9 g (49.0%).

After the addition of the fill, the mixture was homogenized at 7200 rpm for 10 min using a Tekmar SD-45 homogenizer equipped with a G456 head. The droplets were 30 μm or less in diameter. The dispersion was stable, and the Coulter analysis showed a median droplet diameter of 11.25 μm.

An additional 5 g of Cab-O-Sil™ EH-5 silica was added and the mixture was homogenized for an additional 10 minutes. The Coulter analysis showed the median droplet diameter to be reduced to 10.86 μm. The reactor contents had heated to 66° C. during the homogenization.

The reactor was placed in a water bath set at 50° C., the homogenizer was replaced with a Cole Palmer 5.08 cm diameter three blade agitator (Cole Palmer Catalog No. N-0544-10) set 1.27 cm from the bottom of the reactor, and stirred at about 800 rpm, until the contents of the reactor had equilibrated with the bath temperature; then 27.6 ml of 37% formaldehyde was added. Stirring was continued for 2 hours, the temperature was lowered to 25° C., and 7 ml of 28% ammonium hydroxide was added to neutralize the slurry and bring the pH to 7.3. The capsules were spherical and the walls were smooth. Data from the Coulter particle size analyzer data showed the capsule size distribution had a 50% volumetric diameter of 10.3 μm, which is in the preferred range of 3–12 μm.

A CB sheet coated with the capsules in sodium alginate in the manner of Experiment 4 gave a good image with the CF sheet.

If the amount of Cab-O-Sil colloidal silica in the above experiment was raised to 15 g, the aqueous phase became so viscous that much more vigorous agitation was necessary to achieve a uniform mixing.

Experiment 7

Interfacial Polymerization Encapsulation Using Colloidal Silica—Nalco 1034A.

A one liter baffled reactor was charged with water, 550.00 g; Nalco 1034A colloidal silica, 37.00 g; and fill, 180 g. The fill consisted of N,N'-(dioctanoyloxyethyl)dithiooxamide, 17.6 g; diethyl phthalate 23.9 g; tributyl phosphate 35.9 g; toluene, 75.6 g; and Mondur MRS isocyanate, 27.00 g. Mondur MRS is a polymethylene polyphenyl isocyanate manufactured by Mobay Chemical Corporation. The temperature of the reactor was equilibrated at 21.1° C. and the reactor contents were mixed with a Waring Blender blade set 1.27 cm off the reactor bottom and with a speed set to 2300 rpm. After 5 min of mixing, 180 ml of a 25% solution of tetraethylene pentamine in water was added dropwise over one hour. Stirring was continued for an additional hour after which a sample was withdrawn and the particle size was determined. The capsules produced had a 50% volumetric diameter of 6.3 µm and a 95% volumetric diameter of 14.3 µm or less.

The capsules were evaluated in a coated CB sheet, as in Experiment 2 above, and were found to give good image density.

Experiment 8

Interfacial Polymerization Encapsulation Using Colloidal Silica—Cab-O-Sil™ EH-5.

A one liter baffled reactor was charged with water, 550.00 g; Cab-O-Sil EH-5 colloidal silica, 10.94 g; and fill 180 g. The fill consisted of N,N'-(dioctanoyloxyethyl) dithiooxamide, 17.6 g; diethyl phthalate 23.9 g; tributyl phosphate 35.9 g; toluene 75.6 g; and Mondur MRS isocyanate, 27.00 g. The temperature of the reactor was equilibrated at 18° C. and the reactor contents were homogenized with the Tekmar SD-45 homogenizer with the G 456 head. The speed was set at 7,200 rpm and homogenized for ten minutes. The homogenizer was removed and the reactor was stirred with a 6 flat blade agitator with speed set for 1150 rpm while 153 ml of 25% tetraethylene pentamine was added dropwise. Mixing was continued for one hour, then a sample was removed for particle size analysis. The capsules produced had a 50% volumetric diameter of 5.4 µm and a 95% volumetric diameter of 9.3 µm or less.

If the amount of Cab-O-Sil colloidal silica in the above experiment was raised to 15 g, the aqueous phase became so viscous that much more vigorous agitation was necessary to suspend the oil droplets.

The following experiments demonstrate the use and advantage of colloidal silica in urea-melamine-formaldehyde (UMF) and urea-formaldehyde (UF) encapsulations.

Experiment 9

Urea-Melamine-Formaldehyde Encapsulation using Colloidal Silica.

A precondensate solution was prepared comprising 180.89 g of formalin (37% formaldehyde), 57.3 g of urea, 10.71 g of melamine, and 0.64 g of potassium tetraborate contained in a 1-L reactor equipped with a stirrer and water bath. The potassium tetraborate melamine, and urea were added to the reactor followed by the formalin. The mixture was heated to 71.1° C. and was maintained at that temperature for 2.5 hours. The reaction mixture was then diluted with 285.81 g water and allowed to cool to room temperature and age overnight. The precondensate solution was then ready for use in the encapsulation process.

The precondensate solution and fill were combined in a one liter reactor to make capsules according to the following procedure. The temperature of the reactor was set to 21.1° C., and 535.33 g of the UMF precondensate, 45.00 g of Nalco 1034A colloidal silica, 30.59 g of NaCl, and 77.93 g of water were added and mixed. Upon dissolution of the salt, the mixture was stirred for 5 minutes at 2300 rpm with a Waring blender blade set 1.26 cm of the reactor bottom, and 192.66 g of fill solution was added. The fill solution comprised N,N'-(dioctanoyloxyethyl)dithiooxamide, 10.5%; N,N'-dibenzyldithiooxamide, 1.50%; diethyl phthalate, 15.62%; tributyl phosphate, 23.44%; and cyclohexane, 49.44%. After 5 minutes, 10% HCl was added over 5 minutes to adjust the pH to 3.00 and to catalyze the UMF polymerization. After 12 minutes, an additional 10% HCl was added over 12 minutes to adjust the pH to 1.85. The reaction was allowed to stir for 1 hr at 21.1° C. The reactor temperature was raised to 60° C. and maintained at that temperature for 1.75 hr to cure the capsules. After curing, the slurry was neutralized with ammonia to pH 8, cooled to room temperature, filtered through a 500 µm screen, and stored.

Particle size, determined by evaluation with a Coulter TA-II particle size analyzer equipped with a 140 µm aperture tube indicated a 50% volumetric diameter of 10.1 µm.

Experiment 10

Urea-Melamine-Formaldehyde Encapsulation without Colloidal Silica.

UMF capsules were prepared as described above but without colloidal silica present in the encapsulation media. Capsules thus obtained were very large in size and had a 50% volumetric diameter of 40.8 µm.

Experiment 11

Urea-Formaldehyde Encapsulation using Colloidal Silica.

A precondensate solution was prepared comprising 191.88 g of formalin (37% formaldehyde), 71.5 g of urea, and 0.63 g of potassium tetraborate, contained in a 1-L reactor equipped with a stirrer and water bath. Potassium tetraborate, urea, and formalin were added and the mixture was heated to 71.1° C. and the reaction was maintained at that temperature for 2.5 hours. Water, 327.93 g was then added, the reaction was allowed to cool to room temperature and aged overnight. The precondensate solution was then ready for use in the encapsulation process.

The precondensate solution and fill were combined in a 1-L reactor to make capsules according to the following procedure. The temperature of the reactor was set to 21.1° C., and 533.80 g of the UF precondensate, prepared above, 45.00 g of Nalco 1034A colloidal silica, 30.56 g of NaCl, and 79.00 g of water were added and mixed. Upon dissolution of the salt, the mixture was stirred for 5 minutes at 2300 rpm with a Waring blender blade set 1.26 cm off the reactor bottom, and 193.02 g of fill solution was added. The fill solution comprised N,N'-(dioctanoyloxyethyl) dithiooxamide, 10.5%; N,N'-dibenzyldithiooxamide, 1.50%; diethyl phthalate, 15.62%; tributyl phosphate, 23.44%; and cyclohexane, 49.44%. After 5 minutes, 10% HCl was added over 5 minutes to adjust the pH to 3.00 and to catalyze the UMF polymerization. After 12 minutes, an additional 10% HCl was added over 12 minutes to adjust the pH to 1.85. The reaction was allowed to stir for 1 hour at 21.1° C. The reactor temperature was raised to 60° C. and maintained at that temperature for 1.75 hours to cure the capsules. After curing, the slurry was neutralized with ammonia to pH 8, cooled to room temperature, filtered through a 500 µm screen, and stored.

Particle size, determined by evaluation with a Coulter TA-II particle size analyzer equipped with a 140 µm aperture indicated a 50% volumetric diameter of 7.8 µm.

The results of Experiments 2–11 are shown in the following Table 2.

TABLE 2

50% Volumetric Diameter of Capsules Prepared Using Various Dispersing Aids

| Example | Encapsulation Type | Colloid | 50% Volumetric Diameter |
|---|---|---|---|
| 2 | UF[1] | Nalco 1034A | 8.7 μm |
| 3 | UF[1] | NyacolZr50/20 | 9.1 μm |
| 4 | UF[1] | None | 20.8 μm |
| 5 | URF[2] | Nyacol Zr50/20 | 4.5 μm |
| 6 | URF[2] | Cab-O-Sil EH-5 | 10.3 μm |
| 7 | IF[3] | Nalco 1034A | 6.3 μm |
| 8 | IF[3] | Cab-O-Sil EH-5 | 5.4 μm |
| 9 | UMF[4] | Nalco 1034A | 10.1 μm |
| 10 | UMF[4] | None | 40.8 μm |
| 11 | UF[1] | Nalco 1034A | 7.8 μm |

UF[1] = urea-formaldehyde shell
URF[2] = urea-resorcinol-formaldehyde shell
IF[3] = interfacial polymerization polyurea shell
UMF[4] = urea-melamine-formaldehyde shell Table 2 illustrates the 50% volumetric diameters of capsules not employing colloids exceeds 12 μm, which is above the preferred range of 3–12 micrometers. Thus, the capsules not employing colloids exceeds the upper useful limit of the present invention.

The following experiments demonstrate the use of colloidal particles in the formation of capsules containing acid-tripped leuco dye color-formers.

Experiment 12

Urea-Formaldehyde Encapsulation using Colloidal Silica.

This encapsulation was based on that described by Matson (see, G. W. Matson, U.S. Pat. No. 3,156,941. A precondensate solution and fill were combined as in Experiment 2 above, to make capsules according to the following procedure. The temperature of the reactor was set to 21.1° C., and 2,249.67 g of UF precondensate, 467.01 g of Nalco 1034A colloidal silica, 197.64 g of NaCl, and 1,712.47 g of water were added and mixed to dissolve the salts. The mixture was homogenized with a 7.00 cm diameter bar turbine set 5 cm off the bottom of the reactor at 3000 rpm and 1,733.51 g of fill solution was added and homogenized for 10 min. The fill solution comprised Pergascript Orange I-5R color former, 8.67 g, (0.50%); Pergascript Red I-6B color former, 5.20 g (0.30%); Pergascript Blue I-2R color former, 6.93 g (0.40%); Pergascript Green I-2GN color former, 22.54 g (1.30%); Pergascript Black I-R, 43.34 g (2.50%); diethyl phthalate, 741.08 g (42.75%); and cyclohexane 905.76 g (52.25 g). After 5 minutes, 10% HCl was added to adjust the pH to 2.85. After 22 minutes, 10% HCl was added until the pH dropped to 2.43. After 28 minutes, 10% HCl was added to adjust the pH to 2.07. After 34 minutes, 10% HCl was added to adjust the pH to 1.70. After 1.75 hour, the reactor temperature was raised to 60° C. and maintained at that temperature for 0.75 hr to cure the capsules. After curing, the slurry was neutralized with 30% ammonium hydroxide solution and cooled to room temperature, filtered through a 500 pm mesh screen, and particle size evaluated with a Coulter TA-II particle size analyzer equipped with a 140 μm aperture tube. The 50% volumetric size was 5.51 μm. A CB sheet was prepared using sodium alginate solution as in Experiment 2 above and was found to image well in a carbonless paper construction with a CF sheet coated with an acid developer.

Experiment 13

The encapsulation described in Experiment 12 was repeated using Nalco 1042 colloidal silica to afford capsules having a 50% volumetric diameter of 6.28 μm. Nalco 1042 differs from Nalco 1034A colloidal silica in having a turbidity (Hach) NTU value of 140. Nalco 1034A colloidal silica has a turbidity (Hach) value NTU of 190.

Experiment 14

Effect of Colloid Incorporation on Wall Permeability.

A one liter baffled reactor was charged with water, 218.00 g; Nalco 1034A colloidal silica, 15.00 g; and fill, 137 g. The fill consisted of Reldan™ insecticide, 132 g of a 66.1% solution of active ingredient in an organic solvent; Igepalco-630, 1.00 g; and Mondur MRS isocyanate, 4.00 g. (Reldan™ is an insecticide manufactured by Dow Chemical Company; and Igepal Co-630 is a nonionic surfactant manufactured by GAF Corporation.) The temperature of the reactor was 21.1° C. and the reactor contents were stirred with a Waring Blender blade set 2.54 cm from the bottom of the reactor. The speed was maintained at 2000 rpm. Tetraethylene pentaamine, 28 gm of a 10.7% solution in water was added dropwise. Stirring was maintained. A sample was withdrawn and the particle size was determined. The 50% volumetric diameter was 15.4 μm.

As a comparative example, the above reaction was run in an identical manner except that the Nalco 1034A colloidal silica was replaced with 15 g of water. The 50% volumetric diameter was 15.7 μm.

Two grams of each capsule slurry were placed in flasks and stirred with a 3 propeller blade agitator. A solution of 691.6 g (700 ml) of propylene glycol containing 15 wt % ethanol was added to each flask. After a given time, a 1–2 ml sample of liquid was removed and filtered through a 0.2 μm disc filter into a vial for analysis of percent Reldan extracted. The samples were analyzed by gas chromatography on a Hewlett-Packard HP 5890 gas chromatograph and HP 3303A integrator, equipped with a flame ionization detector and employing helium as the carrier gas. A fused silica DB-5 capillary column (15 m×0.246 mm) with a 0.25 μm film thickness was employed. The temperature, was maintained at 215° C.

The results of the extractions, shown below in Table 3, demonstrate that incorporation of colloidal particles into capsule walls prepared by interfacial polymerization results in decreased permeability of the capsule walls.

TABLE 3

Permeability of Reldan ™ from Capsules Prepared With and Without Colloidal Particles in the Shell Wall.

| | % Reldan ™ Remaining in Capsules | |
|---|---|---|
| Time (hr) | with Particles in shell[1] | without Particles in shell |
| 0.25 | 100.0 | 94.9 |
| 0.50 | 95.7 | 94.9 |
| 1.00 | 96.1 | 92.3 |
| 1.50 | 94.8 | 90.3 |
| 2.00 | 95.3 | 85.6 |
| 3.00 | 94.6 | 80.2 |
| 5.50 | 92.8 | 48.2 |
| 7.00 | 91.4 | 46.5 |
| 8.25 | 90.4 | 36.2 |
| 24.00 | 81.2 | 17.1 |
| 29.00 | 77.6 | 8.0 |
| 48.00 | 67.6 | 6.9 |

[1]Colloidal dispersion used was Nalco 1034A

Experiment 15

Effect of Colloidal Particles Incorporation on Wall Volatile Permeability.

Capsules from Experiments 2 and 4 were filtered, washed and dried. The dried capsules were tested by thermal gravimetric analysis to determine the rate of weight loss at 100° C. of the volatile component of the fill (cyclohexane). The capsule weight loss is shown in Table 4. In the initial ten minutes there is a fast weight loss attributed to water escaping that was once retained by the UF polymer. Loss in weight after this period is due to cyclohexane escaping through the capsule wall.

TABLE 4

Thermogravimetric Analysis of Capsules With and Without Colloidal Particles in the Shell

| Time (min) | (% weight loss) with particles in shell | (% weight loss) without particles in shell |
|---|---|---|
| 10 | 0.072 | 0.040 |
| 90 | 0.123 | 0.310 |
| 170 | 0.180 | 0.452 |
| 250 | 0.185 | 0.539 |
| 330 | 0.211 | 0.600 |
| 410 | 0.261 | 0.672 |
| 490 | 0.283 | 0.734 |
| 570 | 0.332 | 0.775 |
| 650 | 0.334 | 0.816 |
| 730 | 0.360 | 0.860 |

The weight loss for capsules made with shells containing the colloidal silica was much lower than the capsules made without the colloidal silica. It is preferred to have a permeability of less than about 0.250 percent weight loss after 250 minutes.

Experiment 16

Effect of Colloidal Particles on Acid Resistance of Capsules.

Forty grams of UF capsules prepared according to Experiment 2 above, were placed in a separatory funnel. Fifty grams of water was added, followed by 100 ml of concentrated hydrochloric acid (37%) resulting in about a 24% hydrochloric acid solution. The funnel was stoppered and the contents vigorously shaken and the layers allowed to separate. After 1 hr the contents of the funnel were inspected. The capsule phase (or upper layer) had only a small amount of free fill. A sample of the upper layer was inspected under a microscope and found to contain mostly undamaged capsules. Thus, the shell walls remain structurally intact after exposure to an acid for at least 60 minutes.

Replacement of the hydrochloric acid with sulfuric acid (98%) gave essentially the same results.

Using 40 g of capsules prepared according to Experiment 4, that is, without a colloid present in the encapsulation medium to control capsule size distribution, the above procedure was repeated. After 1 hr the capsule walls had been dispersed and two liquid phases were present. The upper layer appeared composed only of free capsule fill liquid.

As will be apparent to those skilled in the art, various other modifications can be carried out from the above disclosure without departing from the spirit and scope of the invention.

What is claimed is:

1. Microcapsules having a 50% volumetric diameter ranging between about 3 to 12 micrometers, said microcapsules comprising an oleophilic fill material retained within a synthetic thermoset polymer shell, said shell further comprising colloidal inorganic particles, said particles having average diameter of less than about 0.03 micrometers and having a surface energy selected such that during manufacture of the microcapsule from a solution having an oil phase and an aqueous phase, the particle will migrate to the interface of the oil phase and the aqueous phase, wherein said capsule has reduced permeability such that it exhibits a percent weight loss of less than 0.25% after 250 minutes at 100° C.

2. The microcapsules of claim 1, wherein said colloidal particles are a silica sol.

3. The microcapsules of claim 1, wherein said colloidal particles are zirconium dioxide.

4. The microcapsules of claim 1, wherein said oleophilic fill comprises a color-former dissolved in a hydrophobic solvent.

5. A sheet material coated with the microcapsules of claim 1.

6. The microcapsules of claim 1, wherein said thermoset polymer is an aminoplast polymer.

7. The microcapsules of claim 1, wherein said thermoset polymer is urea-formaldehyde.

8. The microcapsules of claim 1, wherein said thermoset polymer is urea-melamine-formaldehyde.

9. The microcapsules of claim 1, wherein said thermoset polymer is selected from the group consisting of polyester, polyamide, and polyurea polymers.

10. The microcapsules of claim 1, comprising by weight 9–50% urea formaldehyde polymer (dry weight); 1.5– 3.5% of colloidal silica particles (dry weight); and 50–87% of oleophilic fill material.

* * * * *